(12) United States Patent
Paturle et al.

(10) Patent No.: US 7,204,284 B2
(45) Date of Patent: Apr. 17, 2007

(54) TIRE COMPRISING A COLORED DESIGN AND PROCESS FOR OBTAINING IT

(75) Inventors: Antoine Paturle, Durtol (FR); Cédric Delbet, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 328 days.

(21) Appl. No.: 10/808,458

(22) Filed: Mar. 25, 2004

(65) Prior Publication Data
US 2004/0187997 A1 Sep. 30, 2004

(30) Foreign Application Priority Data
Mar. 28, 2003 (FR) .................................. 03 03907

(51) Int. Cl.
*B60C 13/02* (2006.01)
(52) U.S. Cl. ........................ 152/523; 152/525; 359/567
(58) Field of Classification Search ........ 152/523–525; 359/567
See application file for complete search history.

(56) References Cited

U.S. PATENT DOCUMENTS

| | | | | |
|---|---|---|---|---|
| 1,354,471 A | * | 10/1920 | Doner | ........................ 33/41.1 |
| 3,516,730 A | * | 6/1970 | Wood | ........................ 359/567 |
| 4,444,713 A | | 4/1984 | Egan et al. | |
| 4,625,101 A | * | 11/1986 | Hinks et al. | ........... 235/462.01 |
| 5,059,776 A | * | 10/1991 | Antes | ..................... 235/462.01 |
| 5,239,396 A | * | 8/1993 | Thompson | ..................... 359/1 |
| 5,904,794 A | | 5/1999 | Boissonnet et al. | |
| 5,956,164 A | * | 9/1999 | Waitts | ........................... 359/2 |
| 6,235,376 B1 | * | 5/2001 | Miyazaki et al. | ............ 428/203 |
| 2002/0029814 A1 | | 3/2002 | Unger et al. | |

FOREIGN PATENT DOCUMENTS

EP  1 152 904  5/2003

OTHER PUBLICATIONS

Abstract for JP 2000-153675, Jun. 6, 2000.

* cited by examiner

*Primary Examiner*—Geoffrey L. Knable
(74) *Attorney, Agent, or Firm*—Buchanan Ingersoll & Rooney PC

(57) ABSTRACT

Tire made of a rubber-based material of black color comprising at least one design on an outer surface of the said tire, the material being a diene elastomer or rubber, the design having on its outer surface at least one light diffraction grating formed of a plurality of ridges or grooves of height H arranged parallel to one another with a period P. The process for obtaining a design of variable color on an article made of a rubber-based material of black color, the design being visible in at least one color different from black.

9 Claims, 1 Drawing Sheet

TIRE COMPRISING A COLORED DESIGN AND PROCESS FOR OBTAINING IT

The present application claims priority under 35 U.S.C. § 119 to Patent Application Ser. No. 03/03907 filed in France on March 28, 2003, the entire content of which is hereby incorporated by reference.

FIELD OF INVENTION

The invention concerns a process for obtaining a decorative design that is visible in a color other than black so that it contrasts against a rubber material whose color is essentially black. It also concerns a tire comprising on one of its outer surfaces a design that is visible in at least one color different from black.

BACKGROUND OF INVENTION

In many industries it is desired to mark products or articles with inscriptions, logos and various designs one of whose functions is to attract the attention of future users or purchasers, for example during presentation in exhibitions.

This problem arises very particularly in the case of rubber articles whose color is black, such as tires or caterpillar tracks.

One way to achieve this is to deposit on the surface of such products a film of a color that contrasts with the black color; that is what is proposed in the patent U.S. Pat. No. 5,904,794 according to which a transfer comprising a colored design is prepared before being applied to the outer surface of a tire blank before its molding and vulcanization. Although this process effectively enables a design of contrasting color certainly to be obtained on the black-colored surface, the design always shows the same color regardless of the orientation chosen for viewing the tire and whatever the direction of the lighting. Products made of black rubber having such a transfer have an attraction power which is not sufficient.

In the case of a tire, the film of color is joined to the rubber of the tire either directly or via an intermediate bonding layer which ensures that the film sticks to the tire. Besides the difficulties of putting this technique into practice, problems can be encountered with it which relate to inadequate bonding between the transfer and the tire, and hence to loss of the said transfer.

In another patent, EP 1152904, a design with several colors is produced on a rubber article by means of a laser which acts on a vulcanized rubber mix of black color in which at least one filler of a color that contrasts with the black is incorporated.

Like the previous process mentioned, this latter one also only allows the formation of a design having the same colors regardless of the orientation along which the rubber article is viewed; besides, it entails incorporating in the material colored fillers which are exposed by laser once the tire has been molded and vulcanized.

SUMMARY OF THE INVENTION

One object of the present invention is a tire made of a material based on black rubber, which comprises at least one design on an outer surface of the said tire, this material being a diene elastomer or rubber, i.e. an elastomer obtained at least in part from diene monomers, the said design being visible in at least one color different from the black color of the rubber-based material, the said design (3, 30) comprising on its outer surface at least one light diffraction grating formed of a plurality of ridges or grooves of height H, arranged parallel to one another and spaced apart with a period P.

Preferably the period P is less than or equal to 1.5 micron and the height H is at most equal to 1 micron, because the diffraction effect disappears above those limits. More preferably, H is between 0.1 and 0.3 micron and P is between 0.5 and 0.7 micron; better still, H is between 0.17 and 0.23 micron and P is equal to 0.6 micron. These parameters can advantageously be determined as a function of the optical index of the material on which the said design is formed.

Preferably, the parts of the said tire comprising a design are made of a material free from waxes and anti-ozone or anti-oxidant agents that tend to migrate and form a protective layer on the outer surface of the tire, because the presence of such a layer reduces the optical effect produced by the diffraction grating.

The object of the invention is also a process by which a surface of an article made of vulcanized rubber having a dark or black color (in particular but not exclusively a tire, a caterpillar track, or a tire tread) is provided with at least one design that can be seen in colors that are more or less bright and which change depending on the orientation chosen for looking at the said design or on the position of the light source relative to the surface of the article, so as to make the design and the article more noticeable.

This problem is particularly difficult to solve without modifying the formulations of the rubber mixes constituting the tires and in view of the presence of certain essential components such as the reinforcing fillers present in such mixes in the form of aggregates of carbon black or silica whose average size is of the order of or larger than a tenth of a micron. Besides, it is known that the usual tire mixes reflect only a very small amount of incident light (less than 10%).

According to the invention, a process is proposed for obtaining on the outer surface of an article made of vulcanized rubber having a black color, a design whose color is variable, for example as a function of the orientation along which the said article is viewed. This process comprises essentially the following stages:

preparation of a basic design on a support, this design being the form of the design it is desired to reproduce on the outer surface of the rubber article, the surface of this basic design being formed by at least one set of microstructures (micro-striations) defined by a period P and a depth H, the said period P and depth H being smaller than 1 micron so as to form a diffraction grating;

positioning of the support provided with the basic design onto the molding surface of a mould for molding a rubber article;

production of a blank for the rubber article which is not vulcanized and not molded;

molding of a rubber article in the mould by pressing the rubber material against the surface of the said mould and vulcanizing it.

In a way that is surprising on taking account of the rubber material and its specific optical characteristics as described above, this process makes it possible to obtain on the surface of a rubber article of black color a design seen in at least one color different from black and having the contour of the design desired, the surface of the said design being formed of a set of very fine striations that form an optical diffraction grating that has a two-dimensional effect or even a three-dimensional effect in the manner of a hologram.

It has been found that a totally black surface of a rubber mix provided with such a set of microstructures has the advantage of being visible in different colors depending on the orientation of the illumination chosen and on the angle at which the said design is viewed. The light source can also modify the color perceived.

In fact, when a viewer moves relative to the article, the light reflected by the said article and more particularly by the set of striations produces variations in the wavelength entering the eye: it is thus possible, without changing the nature of the materials and without applying a "foreign" body to the surface of the article (in particular by metallisation), to produce marking whose color is variable and contrasts strongly against the black color of the rubber material.

Rubber or rubber-type material is understood to mean a "diene" elastomer or rubber, i.e. in a known way an elastomer obtained at least in part (i.e. a homopolymer or copolymer) from diene monomers (monomers having two carbon-carbon double bonds, whether conjugated or not).

Depending on the rubber material in question, the defining parameters of the set of microstructures (namely the period P and height H) can advantageously be established from the optical index of the said material.

The profile of the diffraction grating molded onto the rubber article can in particular be chosen from among the following shapes: square, rectangular, sinusoidal or triangular. Preferably, the height H is at most equal to 1 micron and the period is at most equal to 1 micron. In a preferred embodiment the height H is between 0.1 and 0.3 micron and the profile of the diffraction grating is square, rectangular or sinusoidal. A square or rectangular profile is obtained by engraving of the micro-electronic type, and a sinusoidal profile by engraving of the holographic type. Since the latter process for obtaining is the more common and the least expensive, a sinusoidal profile is chosen for preference.

Other characteristics and advantages of the invention emerge from the description given below with reference to the attached drawing which shows, as a non-limiting example, an embodiment of a marking on a tire.

DESCRIPTION OF THE PREFERRED EMBODIMENTS

Figure 1:
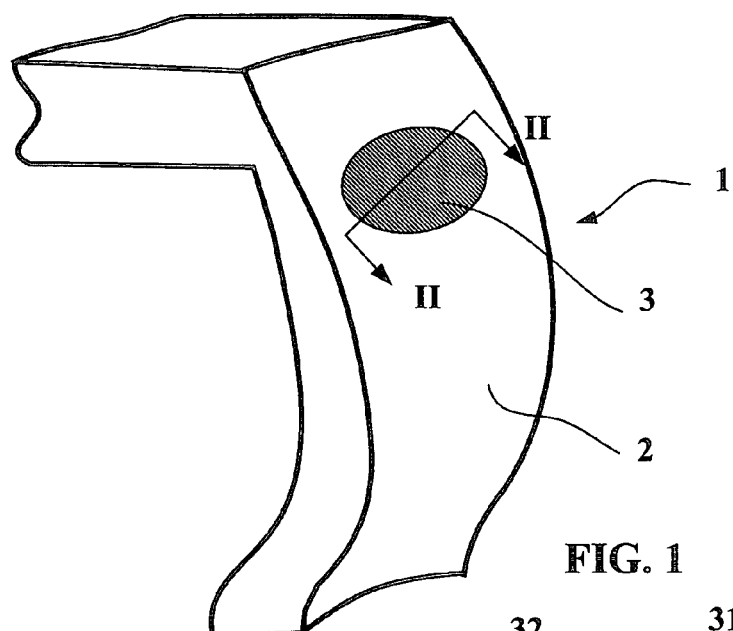
FIG. 1 shows the surface of a tire sidewall comprising a design molded on it, which can be viewed in colors that contrast strongly against the black color of the tire.

FIG. 1 shows a partial view of a tire sidewall 1 of black color on the surface 2 of which, at the time when the said tire was being molded, a design 3 consisting of a single set of microstructures was formed using the process according to the invention.

This design can be seen in colors contrasting strongly against the black color of the surface 2. Depending on the orientation chosen, it is possible that the design may look black, if the light received is not diffracted by the set of microstructures.

Figure 2:
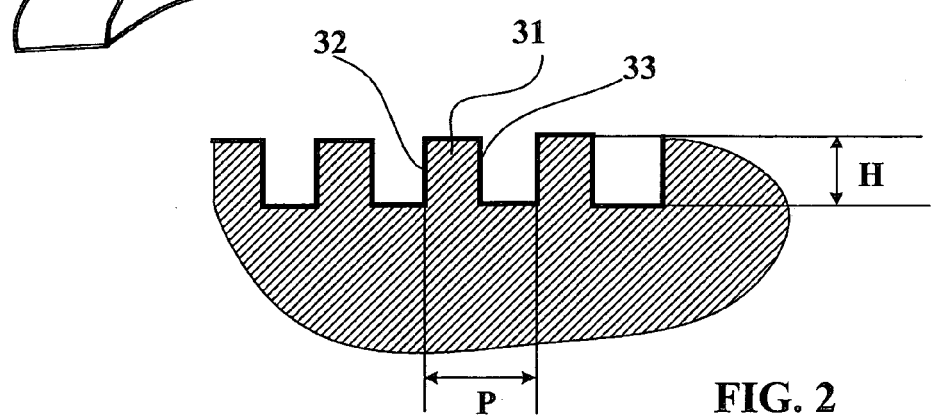
FIG. 2 shows a cross-sectional view of the surface of the tire shown in FIG. 1.

FIG. 2 shows a section through the line II—II across the design 3 in FIG. 1. A plurality of ridges 31 can be seen, separated by grooves; these ridges, whose cross-section is square, are of height H and are arranged parallel to one another with a period P. Thanks to this grating the light incident upon the lateral faces 32 and 33 of the ridges 31 can be diffracted in an optimum way, i.e. concentrating all the energy reflected in at least one given wavelength, even if that energy is weakly reflected by a rubber-based material of essentially black color.

Having regard to the specific nature of rubber-based sidewall materials, the sets of microstructures or diffraction gratings forming the surface of the design consist of a series of ridges essentially parallel to one another and having a height H essentially equal to 0.2 micron, arranged with a period essentially equal to 0.6 micron.

Bearing in mind that rubber reflects light only very little, the results obtained are particularly surprising; a quite intense or even very intense "flash" color is observed within a very narrow angle.

For a given rubber material the color shades that can be obtained can be determined. In effect, the depth parameter H has a direct influence on the colors perceived, while the period P of the micro-striations and the profile shape of the grating each have a direct effect on the intensity with which the design is seen.

To obtain this tire 1 with a design 3 that can be seen in a color other than black, the procedure is as follows:
- a "master" pattern is made in a photosensitive resin by holographic exposure of the design so as to obtain a set of microstructures;
- a replica, said to be the basic replica, is produced by galvanic growth of nickel on the master pattern;
- this basic replica is positioned in a seating provided on the tire mould;
- an unfolded and unvulcanized tire is introduced into the said mould, to mould and vulcanize the said tire.

According to a preferred embodiment whose purpose is to facilitate implementation, the nickel replica obtained in the second stage of the process is stuck to a metallic insert, preferably of stainless steel, before it is positioned in the mould. Sticking is carried out with a silicone adhesive which favors physical attachment between the steel insert and the replica, this type of adhesive being stronger than adhesives that produce chemical attachment. The steel insert is then positioned in the vulcanization mould.

According to another preferred embodiment, at least one replica of the design is made from the basic replica by molding in a material compatible with the pressure and temperature conditions of the tire's molding and vulcanization, such as plastics or thermoplastics. Preferably, a thermoplastic is used which has very good thermal properties even at high temperature (for example, polyetheretherketone (PEEK)) and which has the advantage of reproducing the fineness of the diffraction gratings accurately. This is made using an injection mould with a face covered by the nickel replica. This process is very economical, because the use of a single nickel pattern enables numerous thermoplastic replicas to be produced.

To enhance the visual perception effect still further, it is advantageous to decompose the design into several portions, each portion having its own diffraction grating and characterized in that at least two portions have micro-striations whose mean orientation is different.

Figures 3, 4:
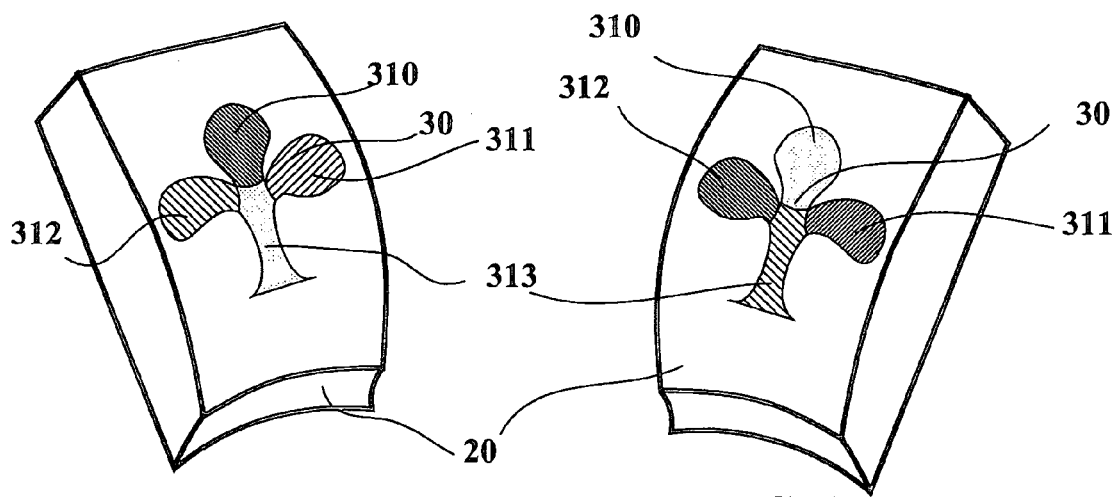
FIGS. 3 and 4 show the same surface of a tire sidewall provided with a design composed of a plurality of portions, each portion having its own set of microstructures, at two different angles of incidence.

For example, FIGS. 3 and 4 show the same part 20 of a tire sidewall viewed along two different angles of incidence. This part 20 is provided on its surface with a design 30 formed in the present case of four portions 310, 311, 312, 313 which fit together to form the said design, each portion having its own diffraction grating characterized by a grating profile, a height H and a period P.

In this case all the portions 310, 311, 312, 313 have the same set of micro-striations (same shape, height H and period P), and only the mean orientations of the said micro-striations are different. Preferably, the angular difference is at least 10°. Thus, a design 30 is obtained which, when viewed along a first incidence (for example, FIG. 3), shows different colors in each portion 310, 311, 312, 313 composing it. But when the same design 30 is viewed along another angle of incidence (for example, FIG. 4), each portion shows a different color compared with the color of the same portion viewed along the first angle of incidence.

Note that the color of the design also changes as a function of the curvature adopted by the tire's sidewall (for example, when passing through the ground contact zone the curvature of the sidewalls increases and the color of the design seen by an external observer changes).

The invention is not limited to the examples described and illustrated, and may be modified in various way without going beyond its scope. In particular, when the material is not colored black, but for example gray, the color effect obtained, although appreciably less visible because less contrasting against that color, is still present.

What is claimed is:

1. A tire made of a rubber-based material of black color comprising at least one attention-attracting design molded onto an outer surface of the tire, this material being a diene elastomer or rubber, i.e. an elastomer obtained at least in part from diene monomers, the design being visible in at least one color different from the black color of the rubber-based material due to the design having on its outer surface at least one light diffraction grating formed by a plurality of ridges or grooves of height H arranged parallel to one another with a period P.

2. The tire of claim 1, wherein the height H of the ridges is less than or equal to 1 micron and their period P is less than or equal to 1.5 micron.

3. The tire of claim 1, wherein the height H is between 0.17 and 0.23 micron.

4. The tire of claim 1, wherein one same design is formed of at least two portions, each portion having at its surface a diffraction grating formed of a plurality of striations, the orientations of the striations of the gratings being different from one another.

5. The tire of claim 4, wherein the difference between the angles of the striations in one portion of the design and in another portion of the same design is at least equal to 10°.

6. The tire of claim 1, wherein the design has on its visible surface at least one diffraction grating whose characteristics enable a hologram to be seen, i.e. an image in three dimensions.

7. The tire of claim 1, wherein the tire material on which the design is arranged is free from waxes and anti-ozone or anti-oxidant agents.

8. The tire of claim 4, wherein the tire material on which the design is arranged is free from waxes and anti-ozone or anti-oxidant agents.

9. The tire of claim 6, wherein the tire material on which the design is arranged is free from waxes and anti-ozone or anti-oxidant agents.

* * * * *